US010887375B2

(12) United States Patent
Cao et al.

(10) Patent No.: US 10,887,375 B2
(45) Date of Patent: *Jan. 5, 2021

(54) SHARED MEMORY DEVICE

(71) Applicant: INTERNATIONAL BUSINESS MACHINES CORPORATION, Armonk, NY (US)

(72) Inventors: Mu Dan Cao, Beijing (CN); Shun Zi Chen, Ningbo (CN); Tian Ji Yang, Beijing (CN); Yi Yao, Beijing (CN); Jian Zhang, Beijing (CN); Yu Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/513,141

(22) Filed: Jul. 16, 2019

(65) Prior Publication Data
US 2019/0342370 A1 Nov. 7, 2019

Related U.S. Application Data

(63) Continuation of application No. 15/648,950, filed on Jul. 13, 2017, now Pat. No. 10,447,765.

(51) Int. Cl.
*H04L 29/08* (2006.01)
*H04L 12/26* (2006.01)
(Continued)

(52) U.S. Cl.
CPC ............ *H04L 67/06* (2013.01); *H04L 41/046* (2013.01); *H04L 43/0882* (2013.01);
(Continued)

(58) Field of Classification Search
CPC ... H04L 67/06; H04L 41/046; H04L 43/0882; H04L 43/50; H04L 67/1097; H04L 67/34; H04L 69/16; G06F 8/61
See application file for complete search history.

(56) References Cited

U.S. PATENT DOCUMENTS

| 9,122,406 B2 | 9/2015 | Matze et al. |
| 2008/0037463 A1* | 2/2008 | Gopal ............... H04W 28/18 370/328 |

(Continued)

FOREIGN PATENT DOCUMENTS

WO 2014055680 A2 4/2014

OTHER PUBLICATIONS

Friedman, Mark J.; List of IBM Patents or Patent Applications Treated as Related; Jul. 15, 2019; 1 page.
(Continued)

*Primary Examiner* — Benjamin M Thieu
(74) *Attorney, Agent, or Firm* — Schmeiser, Olsen & Watts; Nicholas L. Cadmus

(57) ABSTRACT

A method and system for improving a shared memory file transfer setup and usage is provided. The method includes configuring network links connected between hardware nodes. For every shared storage link, each hardware node includes a command section and a data storage section. A storage capacity for a hardware disk drive is determined based on a number of the hardware nodes and the hardware disk drive is connected to the hardware nodes. A software agent is installed within each of the hardware nodes and properties for the network links are configured. Each software agent is enabled and a connectivity status, bandwidth, and loading condition are tested for each of the network links. Each hardware node is registered with the hardware disk drive and communications between the hardware disk drive and the hardware nodes are enabled via the network links.

25 Claims, 8 Drawing Sheets

(51) Int. Cl.
*H04L 12/24* (2006.01)
*H04L 29/06* (2006.01)
*G06F 8/61* (2018.01)

(52) U.S. Cl.
CPC .............. *H04L 43/50* (2013.01); *H04L 67/10* (2013.01); *H04L 67/1097* (2013.01); *H04L 67/12* (2013.01); *H04L 67/34* (2013.01); *H04L 69/16* (2013.01); *G06F 8/61* (2013.01)

(56) References Cited

U.S. PATENT DOCUMENTS

| | | |
|---|---|---|
| 2009/0067438 A1 | 3/2009 | Tsukamoto |
| 2009/0097480 A1 | 4/2009 | Curtis |
| 2010/0274871 A1* | 10/2010 | Harrang .................. H04L 47/19 709/217 |
| 2011/0276633 A1 | 11/2011 | Marchisio |
| 2012/0039341 A1 | 2/2012 | Latif et al. |
| 2013/0039209 A1 | 2/2013 | Trossell et al. |
| 2015/0256617 A1 | 9/2015 | Klose et al. |
| 2015/0324255 A1 | 11/2015 | Kochunni et al. |
| 2016/0034378 A1* | 2/2016 | Li ....................... G06F 11/3612 714/38.1 |
| 2016/0269238 A1 | 9/2016 | Burgess et al. |
| 2019/0020710 A1 | 1/2019 | Cao |

OTHER PUBLICATIONS

PCT Notification of Transmittal of the International Search Report and the Written Opinion of the International Searching Authority, or the Declaration (dated Oct. 25, 2018); PCT/IB2018/054411; International filing date Jun. 15, 2018; Applicant's reference CN160243; 9 pages.

Wang, Jianzong et al; Avoiding Performance Fluctuation in Cloud Storage; 1010 International Conference on High Performance Computing (HiPC); Dec. 19-22, 2010; 4 pages.

Zhang, Baoquan; Storage Area Network; URL: http://www-users.cselabs.umn.edu/classes/Fall-2015/csci8980-AS/slides/SAN-2015.pdf; retrieved from the Internet Dec. 9, 2016; 71 pages.

Examination Report under Section 18(3) dated Mar. 19, 2020; Intellectual Property Office—UK; Application No. GB20011789; 4 pages.

* cited by examiner

SHARED MEMORY DEVICE

CROSS REFERENCE TO RELATED APPLICATIONS

This application is a continuation application claiming priority to Ser. No. 15/648,950 filed Jul. 13, 2017, now U.S. Pat. No. 10,447,765, issued Oct. 15, 2019, the contents of which are hereby incorporated by reference.

FIELD

The present invention relates generally to a method for efficiently transferring data within a memory and in particular to a method and associated system for evaluating network links connected between multiple hardware nodes and transmitting differing portion of a data file from a transmission hardware node to a receiver hardware node via the network links.

BACKGROUND

Processes for transferring data between servers with respect to running applications are well known. A large number of solutions currently exist with respect to network models and associated protocols. Alternative current solutions are associated with standard shared storage and distributed file systems and are typically used only for storing data thereby limiting communications and file transfer processes. Likewise, typical shared storage and distributed file systems are associated with data transfer lag times and only provide a standard speed for transferring data in a shared storage environment.

However, the aforementioned solutions may be associated with bandwidth limitations and stability issues thereby limiting a performance of enterprise systems. Additionally, the aforementioned solutions may not be enabled to prevent data channel failover solutions.

Accordingly, there exists a need in the art to provide a self-discovery process to speed up a data transfer process in a shared storage environment. Additionally, there exists a need in the art to provide an automatic failover process with respect to alternative channels when an IP network is determined to be malfunctioning thereby providing a high availability for data transfer.

SUMMARY

A first aspect of the invention provides a shared memory file transfer setup and improvement method comprising: configuring, by a processor of a network controller hardware device, a plurality of network links connected between a plurality of hardware nodes, wherein each hardware node of the plurality of hardware nodes comprises a command section and a data storage section; determining, by the processor based on a number of the plurality of hardware nodes, a storage capacity for a hardware disk drive; connecting based on the storage capacity, by the processor via at least one storage link, the hardware disk drive to the plurality of hardware nodes; installing, by the processor, a software agent within each of the plurality of hardware nodes; configuring, by the processor, properties for the plurality of network links and the at least one storage link; enabling, by the processor, each the software agent; testing, by the processor executing each the software agent, a connectivity status, a bandwidth, and a loading condition for each of the plurality of network links and the at least one storage link registering, by the processor via each the command section, each the hardware node with the hardware disk drive; and enabling, by the processor, communications between the hardware disk drive and the plurality of hardware nodes via the plurality of network links and the at least one storage link.

A second aspect of the invention provides a shared memory file transfer usage and improvement method comprising: receiving, by a processor of a receiver host hardware node, a request for transferring a data file from an additional hardware node; receiving, by the processor, a summary describing the data file; receiving, by the processor from the additional hardware node via a plurality of network links, a storage link, a storage device, a plurality of data segments of the data file, wherein the plurality of network links, the storage link, and the storage device are connected between the receiver host hardware node and the additional hardware node; transmitting by the processor to the additional hardware node, an acknowledgment notification for each segment of the plurality of data segments indicating successful receipt of each the segment; recording, by the processor, a transfer rate for each the segment being transferred, via the plurality of network links, the storage link, and the storage device from the additional hardware node to the receiver host hardware node; determining, by the processor, that all segments of the data file have been received by the receiver host hardware node; and constructing, by the processor, the data file from the plurality of data segments.

A third aspect of the invention provides a computer program product, comprising a computer readable hardware storage device storing a computer readable program code, the computer readable program code comprising an algorithm that when executed by a processor of a host hardware node implements a shared memory file transfer usage and improvement method, the method comprising: receiving, by the processor, a request for transferring a data file from an additional hardware node; receiving, by the processor, a summary describing the data file; receiving, by the processor from the additional hardware node via a plurality of network links, a storage link, a storage device, a plurality of data segments of the data file, wherein the plurality of network links, the storage link, and the storage device are connected between the receiver host hardware node and the additional hardware node; transmitting by the processor to the additional hardware node, an acknowledgment notification for each segment of the plurality of data segments indicating successful receipt of each the segment; recording, by the processor, a transfer rate for each the segment being transferred, via the plurality of network links, the storage link, and the storage device from the additional hardware node to the receiver host hardware node; determining, by the processor, that all segments of the data file have been received by the receiver host hardware node; and constructing, by the processor, the data file from the plurality of data segments.

A fourth aspect of the invention provides a shared memory file transfer usage and improvement method comprising: determining, by a processor of a transmitter host hardware node, an available number of a plurality of network links for transferring a data file between the transmitter host hardware node and a receiver host hardware node via a storage device; determining, by the processor, an associated priority level for each of the plurality of network links; receiving, by the processor, a request for transferring the data file to the receiver host hardware node; dividing, by the processor in response to the request, the data file into a plurality of segments; assigning, by the processor, a transmission sequence to the plurality of segments; transmitting, by the processor to the receiver host hardware node, a summary describing the data file; determining, by the processor, a transfer ratio for each of the plurality of network links; transmitting, by the processor to the receiver host hardware node, the plurality of segments via the plurality of network links based on each the transfer ratio; receiving, by the processor from the receiver host hardware node, an acknowledgment notification for each segment of the plurality of data segments indicating successful receipt of each the segment; deleting, by the processor from a segment pool storage device, a copy of each the segment; and recording, by the processor, a transfer rate for each the segment being transferred, via the plurality of network links and the storage device to the receiver host hardware node.

A fifth aspect of the invention provides a transmitter host hardware node comprising a processor coupled to a computer-readable memory unit, the memory unit comprising instructions that when executed by the computer processor implements a shared memory file transfer usage and improvement method comprising: determining, by the processor of, an available number of a plurality of network links for transferring a data file between the transmitter host hardware node and a receiver host hardware node via a storage device; determining, by the processor, an associated priority level for each of the plurality of network links; receiving, by the processor, a request for transferring the data file to the receiver host hardware node; dividing, by the processor in response to the request, the data file into a plurality of segments; assigning, by the processor, a transmission sequence to the plurality of segments; transmitting, by the processor to the receiver host hardware node, a summary describing the data file; determining, by the processor, a transfer ratio for each of the plurality of network links; transmitting, by the processor to the receiver host hardware node, the plurality of segments via the plurality of network links based on each the transfer ratio; receiving, by the processor from the receiver host hardware node, an acknowledgment notification for each segment of the plurality of data segments indicating successful receipt of each the segment; deleting, by the processor from a segment pool storage device, a copy of each the segment; and recording, by the processor, a transfer rate for each the segment being transferred, via the plurality of network links and the storage device to the receiver host hardware node.

The present invention advantageously provides a simple method and associated system capable of preventing unauthorized media replication.

DETAILED DESCRIPTION

Figure 1:
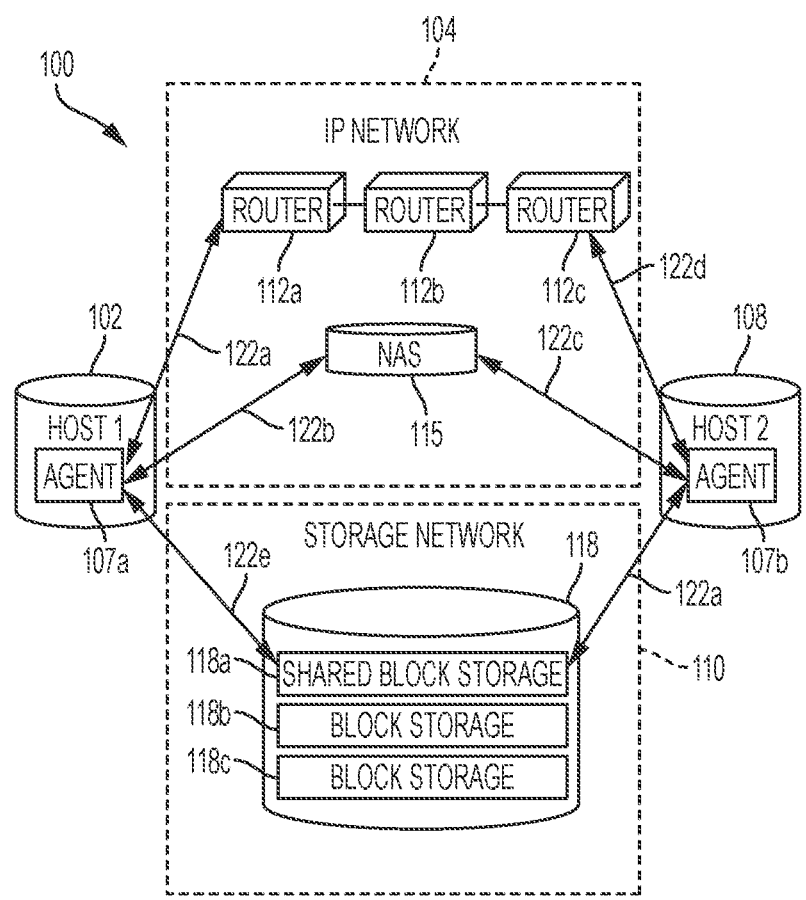
FIG. 1 illustrates a system for improving a shared memory file transfer process, in accordance with embodiments of the present invention.

FIG. 1 illustrates a system 100 for improving a shared memory file transfer process, in accordance with embodiments of the present invention. Typical server based data transfer processes are associated with processes performed at an application layer level. Additionally, typical data transfer processes may enable intercommunications between different types of protocols. For example, protocols may include: Ethernet, fiber channel, and SCSI. The aforementioned process may cause bandwidth limitations and stability issues thereby limiting a performance of enterprise systems.

System 100 allows a user to configure one or more TCP/IP network links (e.g., network links 122a . . . 122n) for all nodes (e.g., nodes 107 and 108) that require data transfer. A shared disk (e.g., comprising a size determined by number of nodes and an associated bandwidth) is attached to each storage controller for the associated nodes such that one or more TCP/IP network links and one or more (FC or IB etc.) storage links are executed by system 100.

System 100 enables an improved process for enabling a fast and secure file transfer process in shared storage environment thereby dynamically resolving file transfer throttling in shared storage environments. System 100 increases a speed of a file transfer process by providing a more efficient storage-copy based file transfer process. Additionally, system 100 utilizes an intelligent algorithm for determining a method for transferring files during file transfer initialization and according to a current file transfer status. System 100 provides:

1. An architecture for increasing a speed of a file transfer within a shared storage cloud environment.
2. A mechanism for determining a process for transferring files.
3. Software code for selecting a specific file transfer method according to a current file transfer status.
4. A transparent fail-over solution during a system malfunction. System 100 enables:

System 100 enables an improved process for assigning transfer loads to a specified channels during a file transfer based on a proportion to a real time transfer ability thereby ensuring that a transfer process will be completed as long as at least one channel is available. Additionally, transfer code associate with the channels is dynamically updated.

System 100 of FIG. 1 includes a host (e.g., transmitter) hardware node 107 (comprising an installed software agent 107a) connected to a host (e.g., receiver) hardware node 108 (comprising an installed software agent 108a) through an IP network 104 and a storage network 110 via network links 122a . . . 122n. System 100 may additionally include multiple hardware nodes similar to host hardware node 107 and host hardware node 108. IP network 104 comprises routers 112a . . . 112n and a network attached storage (NAS) device 115 connecting host hardware node 107 to host hardware node 108 via network links 122*a*, 122*b*, 122*c*, and 122*d*. Storage network 110 a storage device/system 118 connecting host hardware node 107 to host hardware node 108 via network links 122*e* and 122*n*. Storage device/system 118 comprises shared block storage 118*a*, block storage 118*b*, and block storage 118*c*. Host hardware node 107 and host hardware node 108 may each comprise an embedded computer. An embedded computer is defined herein as a dedicated computer comprising a combination of computer hardware and software (fixed in capability or programmable) specifically designed for executing a specialized function. Programmable embedded computers may comprise specialized programming interfaces. Additionally, host hardware node 107, host hardware node 108, IP network 104, and storage network 110 may each comprise a specialized hardware device comprising specialized (non-generic) hardware and circuitry (i.e., specialized discrete non-generic analog, digital, and logic based circuitry) for executing a process described with respect to FIGS. 1-8. The specialized discrete non-generic analog, digital, and logic based circuitry may include proprietary specially designed components (e.g., a specialized integrated circuit designed for only implementing an automated process for improving a shared memory file transfer process). Host hardware node 107, host hardware node 108, IP network 104, and storage network 110 may each comprise specialized memory. The specialized memory may include a single memory system. Alternatively, the specialized memory may include a plurality of memory systems. Host hardware node 107, host hardware node 108, IP network 104, and storage network 110 may each include sensors, processors, and additional software and specialized circuitry. Sensors may include, inter alia, GPS sensors, digital media retrieval streaming sensors, network traffic sensors, etc. IP network 104 and storage network 110 may include any type of network including, inter alia, a local area network, (LAN), a wide area network (WAN), the Internet, a wireless network, etc.

System 100 enables a setup process for configuring host hardware node 107 and host hardware node 108 for executing a shared memory file transfer process as follows:

Network links 122*a* . . . 122*n* (e.g., TCP/IP network links) are configured for data transmission between with hardware node 107 and host hardware node 108. In response, a shared disk (such as storage device/system 118) is connected to hardware node 107 and host hardware node 108 for data transfer. A size of the shared disk may be determined by a number of nodes within system 100 and a bandwidth of associated network links. Additionally, software agents 107*a* and 108*a* are installed within hardware node 107 and host hardware node 108, respectively. Each of network links 122*a* . . . 122*n* is configured with respect to associated properties including a priority property associated with a priority of each network link which. The priorities may be set to an auto value or a numeric value. A higher numeric value represents a greater priority indicating that an agent should use the aforementioned link for transferring data. For example, a network link comprising a value of 2 may be enabled to transfer twice as much data as a network link comprising a value of 1. An auto value enables a software agent to determine each software link's current loading condition and automatically set a numerical value based on an associated loading condition to fully secure an associated network link's bandwidth. An auto value may be modified dynamically when an associated load condition of has changed. A property of discover time may be used to determine how long a software agent will test a network link's bandwidth to determine a priority. Each software agent is executed for testing each network link's connectivity status, bandwidth usage, and loading conditions for determining priorities. Shared storage links are enabled to execute software agents for: (a) locking storage network 110 and registering host hardware nodes 107 and 108 with (shared) storage network 110. Each of host hardware nodes 107 and 108 is associated with a specified section of storage network 110. For example, each of host hardware nodes 107 and 108 may be associated with 100 MB of storage and each specified section of storage network 110 may be sequentially located within storage network 110. A first 1 MB comprises a command section (e.g., see command sections 202*a* . . . 202*d* of FIG. 2, infra) and the remaining 99 MB may comprise a data section (e.g., see data sections 204*a* . . . 204*d* of FIG. 2, infra). A command section may be enabled for relaying node information (e.g., UUID, etc.) such that all protocols associated with each of host hardware nodes 107 and 108 is configured to transfer data. Likewise each data section is configured to transfer the actual data. Each of the software agents is initiates with respect to all of the network links such that all peer nodes a configured through all available links. An associated result is saved for later data transfer use.

System 100 enables a transfer process for transmitting data between host hardware node 107 and host hardware node 108 as follows:

When a process for transferring a file from host hardware node 107 to host hardware node 108 is initiated, agents 107*a* and 107*b* determine how many network links (e.g., network links 122*a* . . . 122*n*) are available between hardware nodes 107 and 108. Additionally, a priority for each of the network links is determined. In response, agent 107*a* and/or 107*b* divide the file for transmission into small segments for concurrent transmission. For example, a 4 GB ISO file may be required to be transferred between hardware nodes 107 and 108 and there are a total of 4 links (i.e., 2 TCP/IP links and 2 storage links) available and it is determined that one TCP/IP link and one storage link is heavily loaded. Therefore, agent 107*a* and/or 107*b* sets a lower priority to the aforementioned two links. Each transmission iteration, agent 107*a* and/or 107*b* will transmit 1 MB through the heavy loaded links and transmit 5 MB through the other two links. If it is further detected (during data transfer), that one of the heavily loaded links comprises a reduced workload, additional data segments a transmitted via this network link. Additionally, if one link is disconnected or malfunctions, agent 107*a* and/or 107*b* will detect the malfunction and re transmit the data segment data through another available link based on associated priorities.

Figure 2:
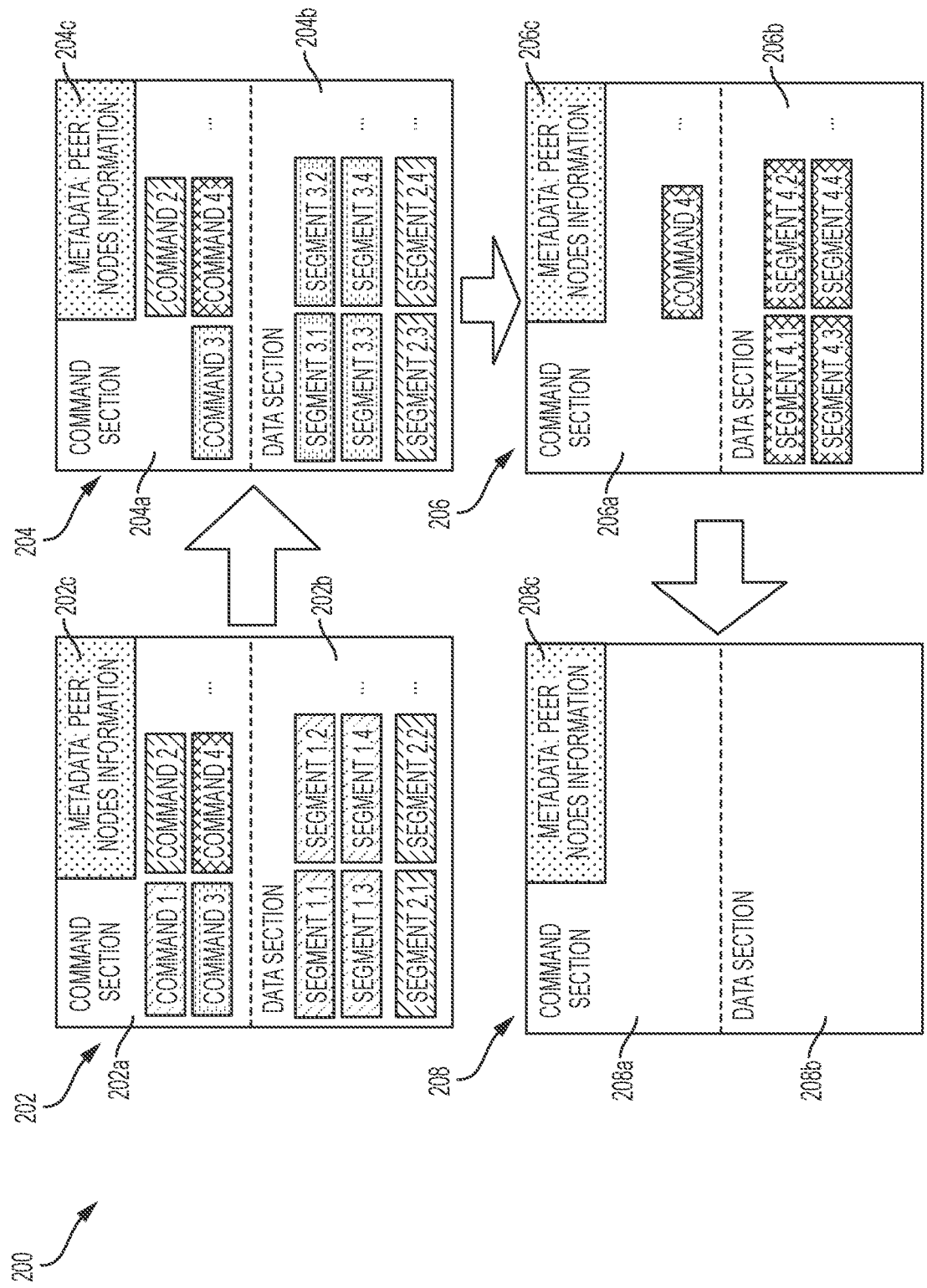
FIG. 2 illustrates an agent initiated process for improving a shared memory file transfer process, in accordance with embodiments of the present invention.

FIG. 2 illustrates an agent initiated process 200 for improving a shared memory file transfer process, in accordance with embodiments of the present invention. Agent initiated process 200 illustrates an agent 202 being modified thereby forming agents 204-208. Agent 202 comprises a command section 202*a*, a data section 202*b*, and metadata 202*c*. Agent 204 comprises a command section 204*a*, a data section 204*b*, and metadata 204*c*. Agent 206 comprises a command section 206*a*, a data section 206*b*, and metadata 206*c*. Agent 208 comprises a command section 208*a*, a data section 208*b*, and metadata 208*c*. When a shared storage link is detected, agent 202 executes a process for locking a share disk drive and subsequently registers an associated (hardware) node with the disk drive. Each node includes an associated portion of the shared disk drive. For example, 100 MB of configurable storage. Each node's associated portion of the shared disk drive is sequentially located on the shared disk drive. A first 1 MB (configurable) is specified as a command section (e.g., command section 202a) and the remaining size is specified as a data section (e.g., data section 202b). The command section is enabled to set node information such as UUID and command (e.g., protocols) the nodes. The data section is used to transfer data. When a first node requests a data transfer to a second node, the following steps are executed:

An initialization step is executed based on statuses for all available links (e.g., priority, load, bandwidth, etc.) between a node A and a node B. In response, an agent within node A determines links for usage and how to divide data between each link. An agent within node A writes a negotiation command within node B's selected storage link's command section thereby notifying an agent within node B that node A has requested access to the associated link for data transfer. Additionally, a command specifying sections of data for transfer is issued. If the agent within node B agrees with the negotiation command, it will write an acknowledge command within node A's command section. If the agent within node B does not agree with the negotiation command, it proposes a new negotiation term placed within node A's command section and the agent within node A honors the new negotiation term. In response, agent A writes data within node A's data section and the agent within node B receives data from node A's data section until all data has been transferred between node A and node B. During the data transfer process, if node A or node B proposes a new transfer term (e.g., the load on this link is to big), it will write the new term within node A's command section. For example, a term for enlarging or reducing the data during a send and receive process. Additional commands may be placed within the node A's command section. For example, if node B loses part of the data, it may write the resend command within node A's command section requesting a resend.

Figure 3:
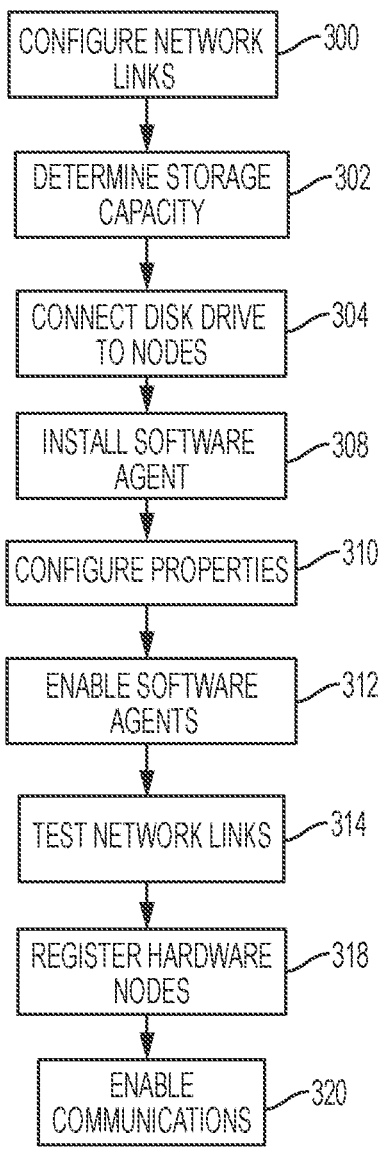
FIG. 3 illustrates an algorithm detailing a process flow enabled by the system of FIG. 1 for constructing setup code for improving a shared memory file transfer process, in accordance with embodiments of the present invention.

FIG. 3 illustrates an algorithm detailing a process flow enabled by system 100 of FIG. 1 for constructing setup code for improving a shared memory file transfer process, in accordance with embodiments of the present invention. Each of the steps in the algorithm of FIG. 3 may be enabled and executed in any order by a computer processor(s) executing computer code. In step 300, network links (e.g., TCP/IP network links) connected between hardware nodes are configured. Each hardware node includes a command section and a data storage section. In step 302, a storage capacity for a hardware disk drive is determined based on a number of the hardware nodes (and optionally a bandwidth for each of the network links). In step 304, the hardware disk drive is connected to the hardware nodes (via a storage link) based on the storage capacity. In step 308, a software agent is installed within each of the hardware nodes. In step 310, properties for the network links and the storage link are configured. The properties may include a priority level for the network links and the storage link and a specified timeframe associated with a testing process. In step 312, each software agent is enabled. In step 314, a connectivity status, a bandwidth, and a loading condition is tested for each of the network links and the storage link. In step 318, each hardware node is registered with the hardware disk drive. In step 320, communications between the hardware disk drive and the hardware nodes are enabled via the network links and the storage link.

Figure 4:
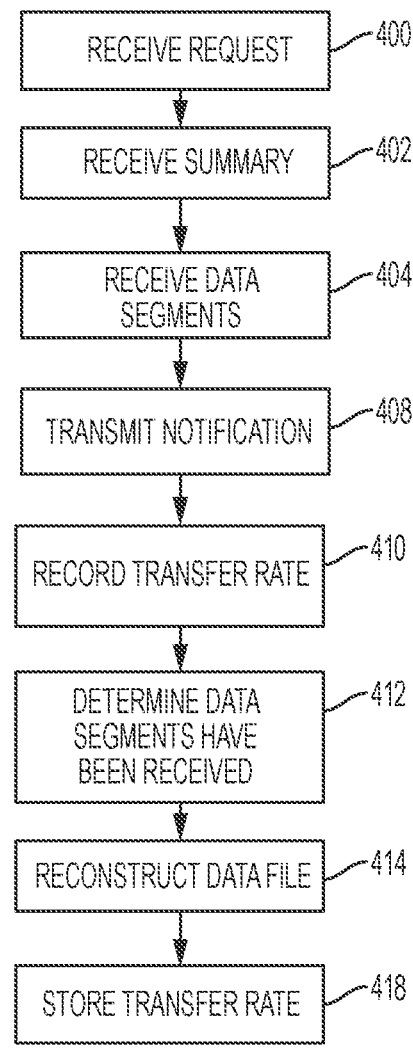
FIG. 4 illustrates an algorithm detailing a process flow enabled by the system of FIG. 1 for improving a shared memory file transfer process, in accordance with embodiments of the present invention.

FIG. 4 illustrates an algorithm detailing a process flow enabled by system 100 of FIG. 1 for improving a shared memory file transfer process, in accordance with embodiments of the present invention. Each of the steps in the algorithm of FIG. 4 may be enabled and executed in any order by a computer processor(s) executing computer code. In step 400, a request for transferring a data file is received (by a receiver host hardware node and based on an availability of each of the network links) from an additional hardware node. In step 402, a summary describing the data file is received. In step 404, data segments of the data file are received from the additional hardware node via network links, a storage link, and a storage device. The network links, the storage link, and the storage device are connected between the receiver host hardware node and the additional hardware node. In step 408, an acknowledgment notification for each segment is transmitted to the additional hardware node. The acknowledgment notification indicates successful receipt of each segment. In step 410, a transfer rate for each segment being transferred from the additional hardware node to the receiver host hardware node is recorded via the network links, the storage link, and the storage device. In step 412, it is determined that all segments of the data file have been received by the receiver host hardware node. In step 414, the data file is reconstructed from the data segments. In step 418, each transfer rate is stored.

Figure 5:
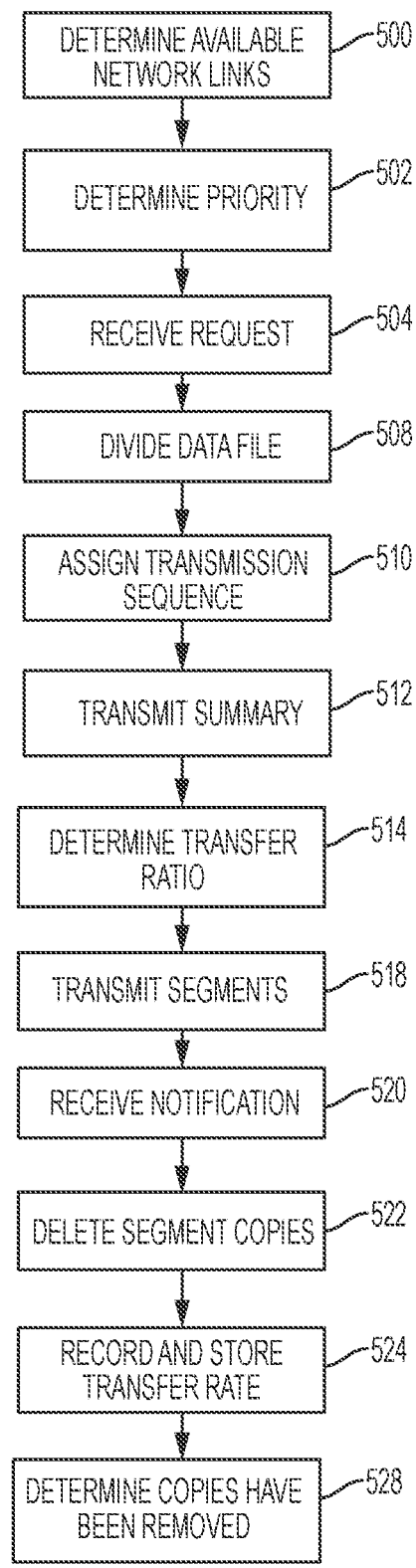
FIG. 5 illustrates an alternative algorithm to the algorithm of FIG. 4 detailing an alternative process flow enabled by the system of FIG. 1 for improving a shared memory file transfer process, in accordance with embodiments of the present invention.

FIG. 5 illustrates an alternative algorithm to the algorithm of FIG. 4 detailing an alternative process flow enabled by system 100 of FIG. 1 for improving a shared memory file transfer process, in accordance with embodiments of the present invention. Each of the steps in the algorithm of FIG. 5 may be enabled and executed in any order by a computer processor(s) executing computer code. In step 500, an available number of network links for transferring a data file between a transmitter host hardware node and a receiver host hardware node via a storage device are determined by a transmitter host hardware node. In step 502, an associated priority level for each of the network links is determined. In step 504, a request for transferring the data file to the receiver host hardware node is received. In step 508, the data file into is divided into a plurality of segments in response to the request of step 504. In step 510, a transmission sequence is assigned to the segments. In step 512, a summary describing the data file is transmitted to the receiver host hardware node. In step 514, a transfer ratio for each of the network links is determined. In step 518, the segments are transmitted to the said receiver host hardware node via the network links based on each transfer ratio. Transmitting the segments may be further based on a bandwidth occupied, a transfer rate, and a network latency for each of the network links. In step 520, an acknowledgment notification for each segment of the data segments is received from the receiver host hardware node. The acknowledgment notification indicates successful receipt of each segment. In step 522, a copy of each segment is deleted from a segment pool storage device. In step 524, a transfer rate for each segment being transferred via the network links is recorded and stored. In step 528, it is determined that the segment pool storage device does not include any more copies of each of the segments.

Figure 6:
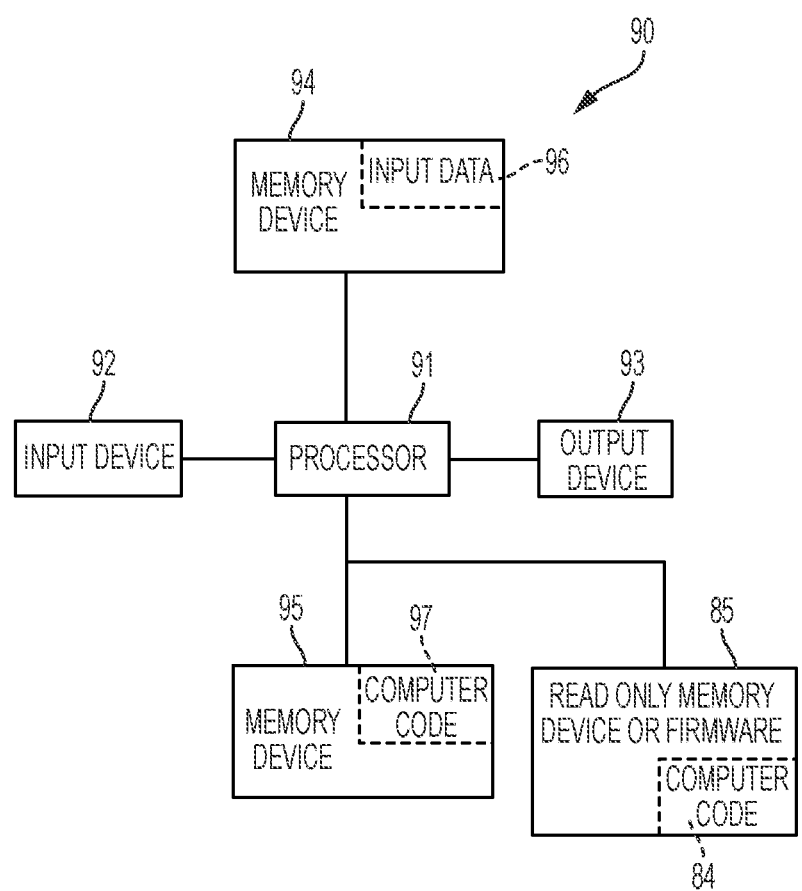
FIG. 6 illustrates a computer system used by the systems of FIG. 1 for improving a shared memory file transfer process, in accordance with embodiments of the present invention.

FIG. 6 illustrates a computer system 90 (e.g., hardware node 107 and/or hardware node 108) used by or comprised by the system of FIG. 1 for improving a shared memory file transfer process, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital media disc (DVD), a dynamic random access memory (DRAM), a read-only memory (ROM), etc. The memory device 95 includes a computer code 97. The computer code 97 includes algorithms (e.g., the algorithms of FIGS. 3 and 4) for enabling a process for improving a digital media content transfer prevention process. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithms of FIGS. 3, 4, and 5) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithm) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve a shared memory file transfer process. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for determining a predicted future state and associated operational attributes for a hardware system. In another embodiment, the invention provides a business method that performs the process steps of the invention on a subscription, advertising, and/or fee basis. That is, a service supplier, such as a Solution Integrator, could offer to enable a process for improving a shared memory file transfer process. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
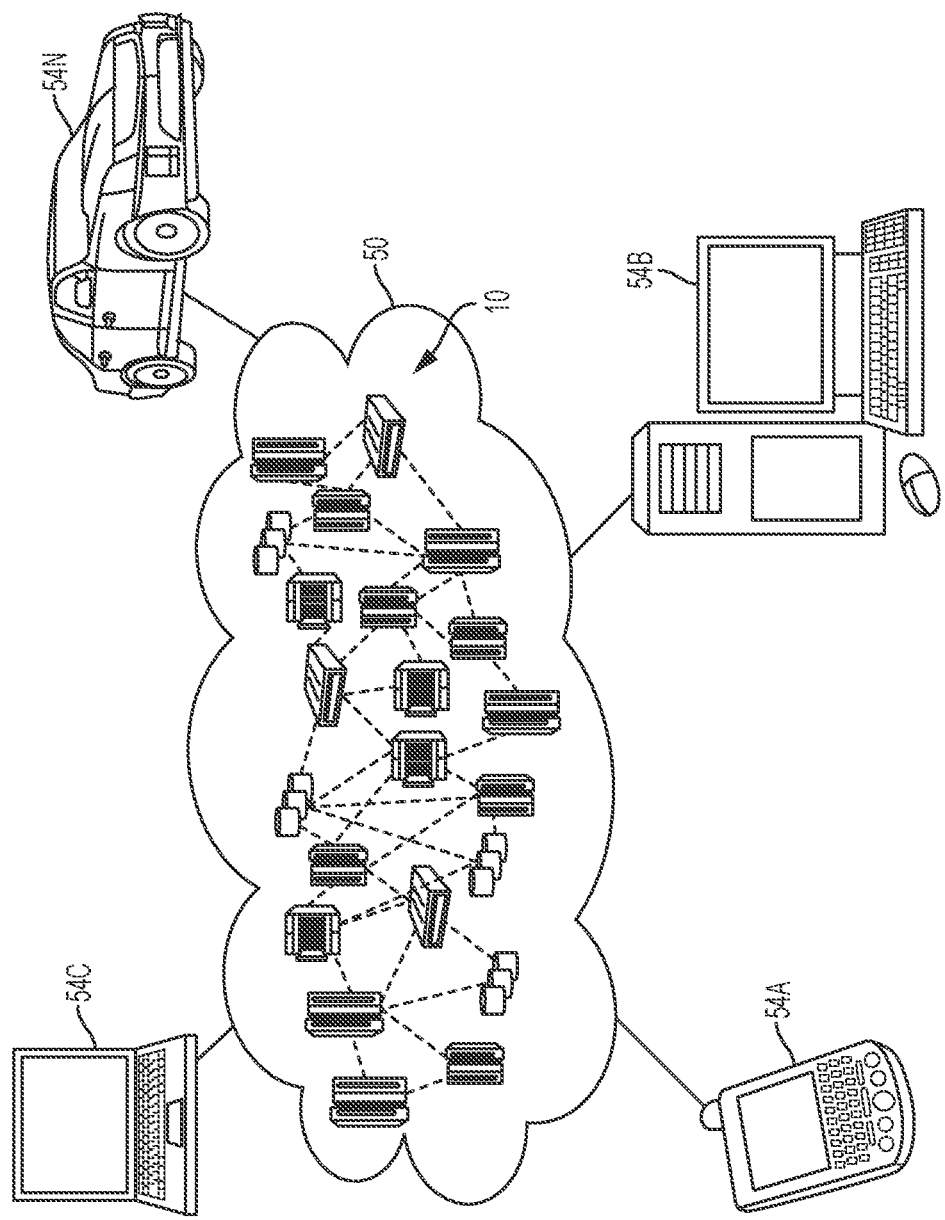
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
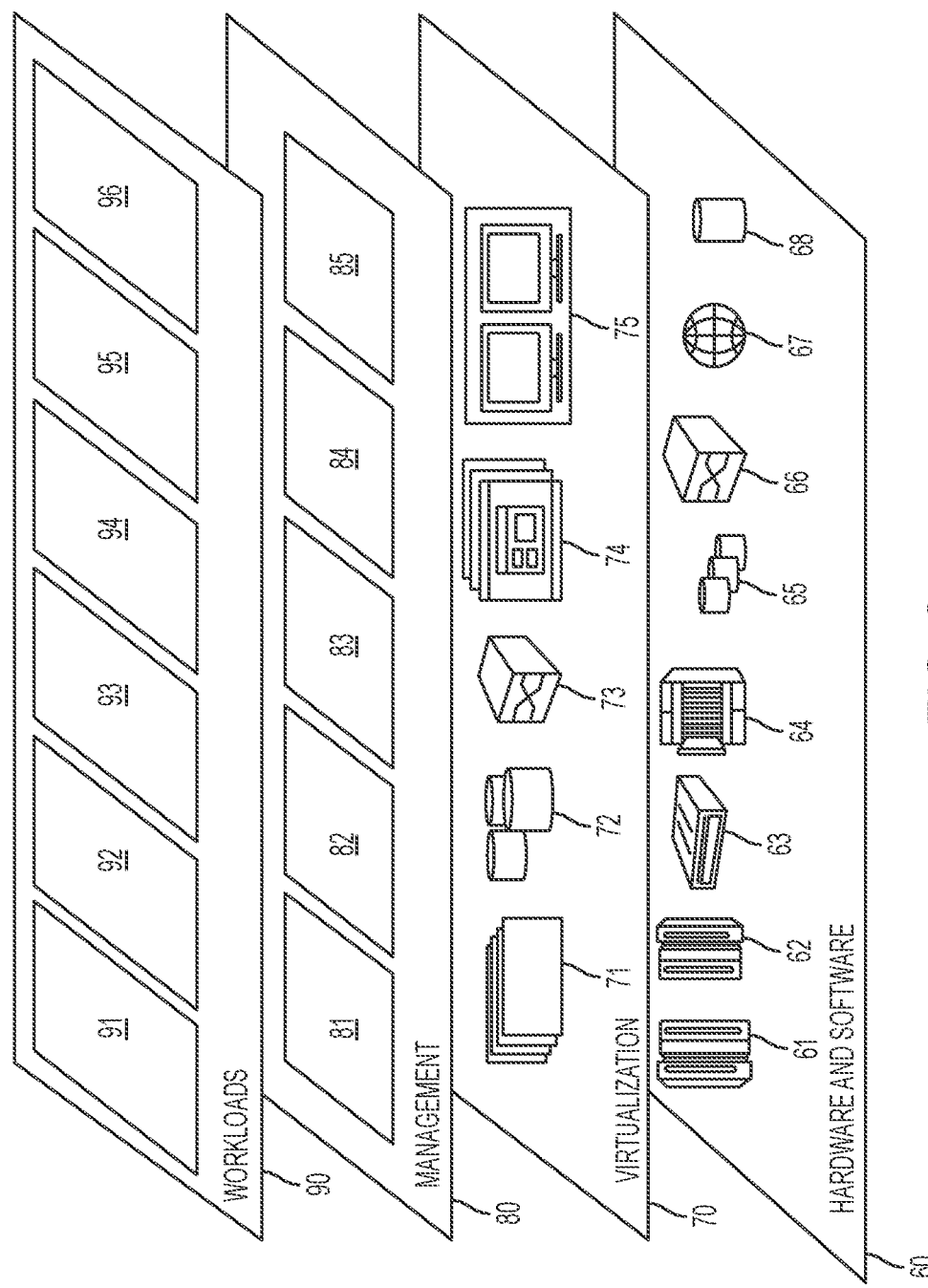
FIG. 8 illustrates a set of functional abstraction layers provided by a cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and improving a shared memory file transfer process 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A shared memory file transfer setup and improvement method comprising:

configuring, by a processor of a network controller hardware device, a plurality of network links connected between a plurality of hardware nodes, wherein each hardware node of said plurality of hardware nodes comprises a command section and a data storage section;

determining, by said processor based on a number of said plurality of hardware nodes, a storage capacity for a hardware disk drive;

connecting based on said storage capacity, by said processor via at least one storage link, said hardware disk drive to said plurality of hardware nodes;

configuring, by said processor, properties for said plurality of network links and said at least one storage link;

testing, by said processor executing a software agent installed within each of said plurality of hardware nodes, a connectivity status, a bandwidth, and a loading condition for each of said plurality of network links and said at least one storage link;

registering, by said processor via each said command section, each said hardware node with said hardware disk drive; and enabling, by said processor, communications between said hardware disk drive and said plurality of hardware nodes via said plurality of network links and said at least one storage link.

2. The method of claim 1, wherein said determining said storage capacity for a hardware disk drive is further based on a bandwidth for each of said plurality of network links.

3. The method of claim 1, wherein said properties for said plurality of network links and said at least one storage link comprise a priority level for said plurality of network links and said at least one storage link and a specified timeframe associated with said testing.

4. The method of claim 1, wherein said plurality of network links comprise TCP/IP network links.

5. The method of claim 1, further comprising:
providing at least one support service for at least one of creating, integrating, hosting, maintaining, and deploying computer-readable code in the control hardware, said code being executed by the computer processor to implement: said configuring said plurality of network links, said determining, said connecting, said configuring said properties, said testing, said registering, said enabling said communications.

6. A shared memory file transfer usage and improvement method comprising:
receiving, by a processor of a receiver host hardware node, a request for transferring a data file from an additional hardware node;
determining, by said processor, a current file transfer status of said receiver host hardware node;
selecting, by said processor, executing software code, a specified file transfer process for transferring said data file;
receiving, by said processor in accordance with execution of said specified file transfer process, a summary describing said data file;
receiving, by said processor from said additional hardware node via a plurality of network links, a storage link, and a storage device, a plurality of data segments of said data file, wherein said plurality of network links, said storage link, and said storage device are connected between said receiver host hardware node and said additional hardware node;
transmitting by said processor to said additional hardware node, an acknowledgment notification for each segment of said plurality of data segments indicating successful receipt of each said segment;
recording, by said processor, a transfer rate for each said segment being transferred, via said plurality of network links, said storage link, and said storage device from said additional hardware node to said receiver host hardware node;
determining, by said processor, that all segments of said data file have been received by said receiver host hardware node; and
constructing, by said processor, said data file from said plurality of data segments.

7. The method of claim 6, wherein said request is determined based on an availability of each of said plurality of network links.

8. The method of claim 7, wherein said request is further determined based on an associated priority level for each of said plurality of network links.

9. The method of claim 6, further comprising:
storing, by said processor, each said transfer rate determined during said recording.

10. The method of claim 6, wherein said plurality of network links comprise TCP/IP network links.

11. A computer program product, comprising a computer readable hardware storage device storing a computer readable program code, said computer readable program code comprising an algorithm that when executed by a processor of a host hardware node implements a shared memory file transfer usage and improvement method, said method comprising:
receiving, by said processor, a summary describing a data file to be transferred from an additional hardware node;
receiving, by said processor from said additional hardware node via a plurality of network links, a storage link, a storage device, a plurality of data segments of said data file, wherein said plurality of network links, said storage link, and said storage device are connected between said receiver host hardware node and said additional hardware node;
transmitting by said processor to said additional hardware node, an acknowledgment notification for each segment of said plurality of data segments indicating successful receipt of each said segment;
recording, by said processor, a transfer rate for each said segment being transferred, via said plurality of network links, said storage link, and said storage device from said additional hardware node to said receiver host hardware node;
determining, by said processor, that all segments of said data file have been received by said receiver host hardware node; and
constructing, by said processor, said data file from said plurality of data segments.

12. The computer program product of claim 11, wherein said request is determined based on an available of each of said plurality of network links.

13. The computer program product of claim 12, wherein said request is further determined based on an associated priority level for each of said plurality of network links.

14. The computer program product of claim 11, wherein said method further comprises:
storing, by said processor, each said transfer rate determined during said recording.

15. The computer program product of claim 11, wherein said plurality of network links comprise TCP/IP network links.

16. A shared memory file transfer usage and improvement method comprising:
determining, by a processor of a transmitter host hardware node, an available number of a plurality of network links for transferring a data file between said transmitter host hardware node and a receiver host hardware node via a storage device;
determining, by said processor, an associated priority level for each of said plurality of network links;
dividing, by said processor in response to receiving a request for transferring said data file to said receiver host hardware node, said data file into a plurality of segments;
assigning, by said processor, a transmission sequence to said plurality of segments;
transmitting, by said processor to said receiver host hardware node, a summary describing said data file;
determining, by said processor, a transfer ratio for each of said plurality of network links;

transmitting, by said processor to said receiver host hardware node, said plurality of segments via said plurality of network links based on each said transfer ratio;

receiving, by said processor from said receiver host hardware node, an acknowledgment notification for each segment of said plurality of data segments indicating successful receipt of each said segment;

deleting, by said processor from a segment pool storage device, a copy of each said segment; and recording, by said processor, a transfer rate for each said segment being transferred, via said plurality of network links and said storage device to said receiver host hardware node.

17. The method of claim 16, wherein said transmitting said plurality of segments via said plurality of network links is further based on a bandwidth occupied, a transfer rate, and a network latency for each of said plurality of network links.

18. The method of claim 16, further comprising:
storing, by said processor, each said transfer rate determined during said recording.

19. The method of claim 16, wherein said plurality of network links comprise TCP/IP network links.

20. The method of claim 16, further comprising:
determining, by said processor, that said segment pool storage device does not comprise anymore copies of each said plurality of segments.

21. A transmitter host hardware node comprising a processor coupled to a computer- readable memory unit, said memory unit comprising instructions that when executed by the computer processor implements a shared memory file transfer usage and improvement method comprising:

determining, by said processor of, an available number of a plurality of network links for transferring a data file between said transmitter host hardware node and a receiver host hardware node via a storage device;

determining, by said processor, an associated priority level for each of said plurality of network links;

dividing, by said processor in response to receiving a request for transferring said data file to said receiver host hardware node, said data file into a plurality of segments;

assigning, by said processor, a transmission sequence to said plurality of segments;

transmitting, by said processor to said receiver host hardware node, a summary describing said data file;

determining, by said processor, a transfer ratio for each of said plurality of network links;

transmitting, by said processor to said receiver host hardware node, said plurality of segments via said plurality of network links based on each said transfer ratio;

receiving, by said processor from said receiver host hardware node, an acknowledgment notification for each segment of said plurality of data segments indicating successful receipt of each said segment;

deleting, by said processor from a segment pool storage device, a copy of each said segment; and recording, by said processor, a transfer rate for each said segment being transferred, via said plurality of network links and said storage device to said receiver host hardware node.

22. The transmitter host hardware node of claim 21, wherein said transmitting said plurality of segments via said plurality of network links is further based on a bandwidth occupied, a transfer rate, and a network latency for each of said plurality of network links.

23. The transmitter host hardware node of claim 21, wherein said method further comprises:
storing, by said processor, each said transfer rate determined during said recording.

24. The transmitter host hardware node of claim 21, wherein said plurality of network links comprise TCP/IP network links.

25. The transmitter host hardware node of claim 21, wherein said method further comprises:
determining, by said processor, that said segment pool storage device does not comprise anymore copies of each said plurality of segments.

* * * * *